United States Patent
Kailavaara

(10) Patent No.: US 12,435,743 B2
(45) Date of Patent: Oct. 7, 2025

(54) CONTROLLING BOOM OF WORK MACHINE

(71) Applicant: PONSSE OYJ, Vieremä (FI)

(72) Inventor: Tatu Kailavaara, Vieremä (FI)

(73) Assignee: PONSSE OYJ, Vieremä (FI)

( * ) Notice: Subject to any disclaimer, the term of this patent is extended or adjusted under 35 U.S.C. 154(b) by 132 days.

(21) Appl. No.: 18/007,559

(22) PCT Filed: Jun. 1, 2021

(86) PCT No.: PCT/FI2021/050401
§ 371 (c)(1),
(2) Date: Dec. 1, 2022

(87) PCT Pub. No.: WO2021/245335
PCT Pub. Date: Dec. 9, 2021

(65) Prior Publication Data
US 2023/0213045 A1    Jul. 6, 2023

(30) Foreign Application Priority Data
Jun. 3, 2020 (FI) .................... 20205576

(51) Int. Cl.
*F15B 21/08* (2006.01)
*A01G 23/02* (2006.01)

(52) U.S. Cl.
CPC ............ *F15B 21/087* (2013.01); *A01G 23/02* (2013.01); *F15B 2211/6336* (2013.01)

(58) Field of Classification Search
CPC . F15B 21/087; F15B 2211/6336; A01G 23/02
(Continued)

(56) References Cited

U.S. PATENT DOCUMENTS 3,554,245 A * 1/1971 Eynon .................. A01G 23/085
144/34.1
3,812,892 A * 5/1974 Jasinski ............... A01G 23/085
144/343
(Continued)

FOREIGN PATENT DOCUMENTS

CN    110206081    9/2019
CN    110303472    10/2019
(Continued)

OTHER PUBLICATIONS

Pedersen,Mikkel,MichaelRygaardHansen, andMortenBallebye."DevelopingaToolPointControlSchemeforaHydraulicCraneUsingInteractive Real-TimeDynamicSimulation."Modeling,IdentificationandControl31.4(2010):133-143.Web(Year: 2010).*

(Continued)

*Primary Examiner* — Ramya P Burgess
*Assistant Examiner* — Keith A von Volkenburg
(74) *Attorney, Agent, or Firm* — Nixon & Vanderhye PC

(57) ABSTRACT

In the disclosed solution, a boom assembly of a work machine is controlled by tip control. In tip control, a control command is given to a tip of a boom assembly, converted into control commands for individual actuators of the boom assembly. In the disclosed solution, a variable related to a load and its position at the tip of the boom assembly is defined, and the variable in question related to the load and its position at the tip of the boom assembly is taken into account in the control command for the actuator.

16 Claims, 3 Drawing Sheets

(58) Field of Classification Search
USPC .......................................................... 701/50
See application file for complete search history.

(56) References Cited

U.S. PATENT DOCUMENTS

| | | | |
|---|---|---|---|
| 4,569,379 A * | 2/1986 | Gemmell-Murdoch | A01G 23/085 144/24.13 |
| 5,640,996 A | 6/1997 | Schlecht et al. | |
| 5,908,122 A * | 6/1999 | Robinett | B66C 13/063 901/17 |
| 7,040,044 B2 * | 5/2006 | Brickner | E02F 3/437 37/414 |
| 7,093,383 B2 * | 8/2006 | Mennen | E02F 3/432 701/50 |
| 9,725,874 B2 * | 8/2017 | Meguriya | E02F 9/265 |
| 10,144,621 B2 | 12/2018 | Braun et al. | |
| 10,407,282 B2 * | 9/2019 | Henikl | B66C 13/066 |
| 2005/0138850 A1 * | 6/2005 | Brickner | E02F 3/437 37/348 |
| 2006/0062662 A1 * | 3/2006 | Curl | E02F 3/388 414/680 |
| 2014/0148984 A1 * | 5/2014 | Nishi | B60W 20/10 180/65.265 |
| 2015/0292178 A1 * | 10/2015 | Nagato | E02F 9/2285 701/50 |
| 2015/0299985 A1 * | 10/2015 | Takehara | B60K 1/00 903/904 |
| 2015/0353328 A1 | 12/2015 | Palmroth et al. | |
| 2016/0024743 A1 * | 1/2016 | Ulrich | E02F 3/32 29/897 |
| 2016/0138245 A1 * | 5/2016 | Moki | B60K 6/12 903/906 |
| 2017/0036894 A1 | 2/2017 | Braun et al. | |
| 2017/0241105 A1 * | 8/2017 | Yuzawa | F15B 11/08 |
| 2018/0062555 A1 * | 3/2018 | Sagawa | H02P 27/06 |
| 2019/0071291 A1 * | 3/2019 | Puszkiewicz | B66F 9/075 |
| 2019/0104721 A1 * | 4/2019 | Sullivan | A01M 7/0042 |
| 2019/0105667 A1 * | 4/2019 | Bharatiya | A01M 7/0057 |
| 2019/0160667 A1 | 5/2019 | Henikl et al. | |
| 2019/0218749 A1 * | 7/2019 | Hiromatsu | E02F 9/26 |
| 2019/0338494 A1 | 11/2019 | Moriki et al. | |

FOREIGN PATENT DOCUMENTS

| | | | |
|---|---|---|---|
| CN | 111052019 | 4/2020 | |
| DE | 19726821 A1 * | 1/1998 | ............ E02F 9/2025 |
| DE | 10140814 A1 * | 8/2002 | ............ E02F 9/2033 |
| FI | 20125336 | 9/2013 | |
| FI | 20135085 | 7/2014 | |
| FI | 125724 | 1/2016 | |
| WO | WO-2004005180 A1 * | 1/2004 | ............ G01G 19/18 |

OTHER PUBLICATIONS

Kalmari, Jouko, Juha Backman, and Arto Visala. "Coordinated Motion of a Hydraulic Forestry Crane and a Vehicle Using Nonlinear Model Predictive Control." Computers and electronics in agriculture 133 (2017): 119-127. Web. (Year: 2017).*
Ortizmorales, Daniel et al. "Increasing the Level of Automation in the Forestry Logging Process with Crane Trajectory Planning and Control." Journal of field robotics 31.3 (2014): 343-363. Web. (Year: 2014).*
Hyyti, Heikki, Ville V Lehtola, and Arto Visala. "Forestry Crane Posture Estimation with a Two-dimensional Laser Scanner." Journal of field robotics 35.7 (2018): 1025-1049. Web. (Year: 2018).*
May 8, 2024 Search Report issued in European Patent Application No. 21817988.5, pp. 1-8.
International Search Report and Written Opinion of the ISA for PCT/FI2021/050401, mailed Aug. 26, 2021, 13 pages.
Search Report for FI20205576, dated Dec. 17, 2020, 2 pages.
Oct. 12, 2024 Office Action issued in Chinese Patent Application No. 202180039505.7, pp. 1-12 [machine translation included].
Aug. 30, 2024 Office Action issued in Brazilian Patent Application No. BR112022023847-9, pp. 1-4 [partial English language translation included].
May 28, 2025 Office Action issued in Chinese Patent Application No. 202180039505.7, pp. 1-13 [machine translation included].
Jul. 1, 2025 Office Action issued in Brazilian Patent Application No. BR112022023847-9, pp. 1-9.

* cited by examiner

CONTROLLING BOOM OF WORK MACHINE

This application is the U.S. national phase of International Application No. PCT/FI2021/050401 filed Jun. 1, 2021, which designated the U.S. and claims priority to FI Patent Application No. 20205576 filed Jun. 3, 2020, the entire contents of each of which are hereby incorporated by reference.

BACKGROUND OF THE INVENTION

The invention relates to controlling a boom assembly of a work machine, and in particular to controlling a boom of a work machine by making use of so-called tip control.

A challenge in controlling a boom assembly of a work machine is to be able to control the boom assembly fast and reliably in all usage situations as desired.

BRIEF DESCRIPTION OF THE INVENTION

It is an object of the invention to develop a new method, control system, work machine, and computer program product. The solution according to the invention is characterized by what is disclosed in the independent claims. Preferred embodiments of the invention are disclosed in the dependent claims.

In the disclosed solution, the boom assembly of a work machine is controlled by tip control. In tip control, a control command is given to a tip of a boom assembly, converted into control commands for individual actuators of the boom assembly. In the disclosed solution, a variable related to a load and its position at the tip of the boom assembly is defined, and the variable in question related to the load and its position at the tip of the boom assembly is taken into account in the control command to an actuator. With such a solution, it is possible to control an actuator to move very precisely at a desired speed along a desired path in various situations. It is even possible to maintain the precise speed and desired path even if a force that the actuator is subject to were to change during the movement. Different situations may be the result of a weight change of a load being controlled by the tip of the boom assembly, or of a change in the location of the tip of the boom assembly. The movement of an actuator at a desired speed and along a desired path is important for the tip of a boom assembly to move as desired at all times.

According to an embodiment, converting a control command of a tip of a boom assembly into control commands for individual actuators comprises forming a speed request for an individual actuator, with the control command being the magnitude of the control signal for the actuator. The magnitude of the actuator's control signal in such a case depends on the speed request of the actuator and the variable in question related to the load and its location at the tip of the boom assembly. This way, implementing control is simple and straightforward.

According to an embodiment, a table is compiled on the interrelations between the magnitude of a control signal of an actuator, speed request of the actuator, and the variable related to the load and its position at the tip of the boom assembly, and the magnitude of the actuator's control signal is determined from the table in question. Forming, using, and administering the table is straightforward and efficient.

According to an embodiment, a largest allowed limit value is determined for the difference between the speed of the actuator and speed request of the actuator, the speed of the actuator is measured, the speed of the actuator is compared to the speed request of the actuator, and if the difference between the measured speed and speed request exceeds the allowed limit value, the table in question is calibrated. This allows control to be maintained precise and managed even if changes took place in the conditions and/or equipment, which tend to decrease the reliability of control.

According to an embodiment, the variable in question related to the load and its position at the tip of the boom assembly is the pressure on the boom assembly actuator. Measuring pressure is relatively simple, and the correlation between the actuator pressure and control precision is surprisingly good.

BRIEF DESCRIPTION OF THE DRAWINGS

The invention will now be described in more detail in connection with preferred embodiments and with reference to the accompanying drawings, in which.

DETAILED DESCRIPTION OF THE INVENTION

In tip control, an operator gives a command to a tip of a boom assembly with a control device, in other words, a request to move to a particular direction at a particular speed. A required speed of movement is calculated for each actuator of the boom assembly so that by the joint effect of the different actuators of the boom assembly, the desired movement of the tip of the boom assembly is achieved.

So, in top control, an operator's control command for moving the boom tip is implemented by dividing the control command into movement of individual booms to move the boom tip according to the control command, by using boom positions and state of motions measured with sensors. The desired movement of the boom tip is divided into parts for different booms by making use of the so-called Jacobian matrix, for example. For implementing tip control, guidance can be found in the following literature references, for example: Björn Löfgren: Kinematic Control of Redundant Knuckle Booms, Licentiate thesis, Department of Machine Design, Royal Institute of Technology, Stockholm, 2004; Björn Löfgren: Kinematic Control of Redundant Knuckle Booms with Automatic Path-Following Functions, Doctoral thesis, Department of Machine Design, Royal Institute of Technology, Stockholm, 2009; Mikkel M. Pedersen, Michael R. Hansen, Morten Ballebye: Developing a Tool Point Control Scheme for a Hydraulic Crane Using Interactive Realtime Dynamic Simulation: Modelling, Identification and Control, Vol. 31, No. 4, 2010, pp. 133-143, ISSN 1890-1328.

Figure 1:
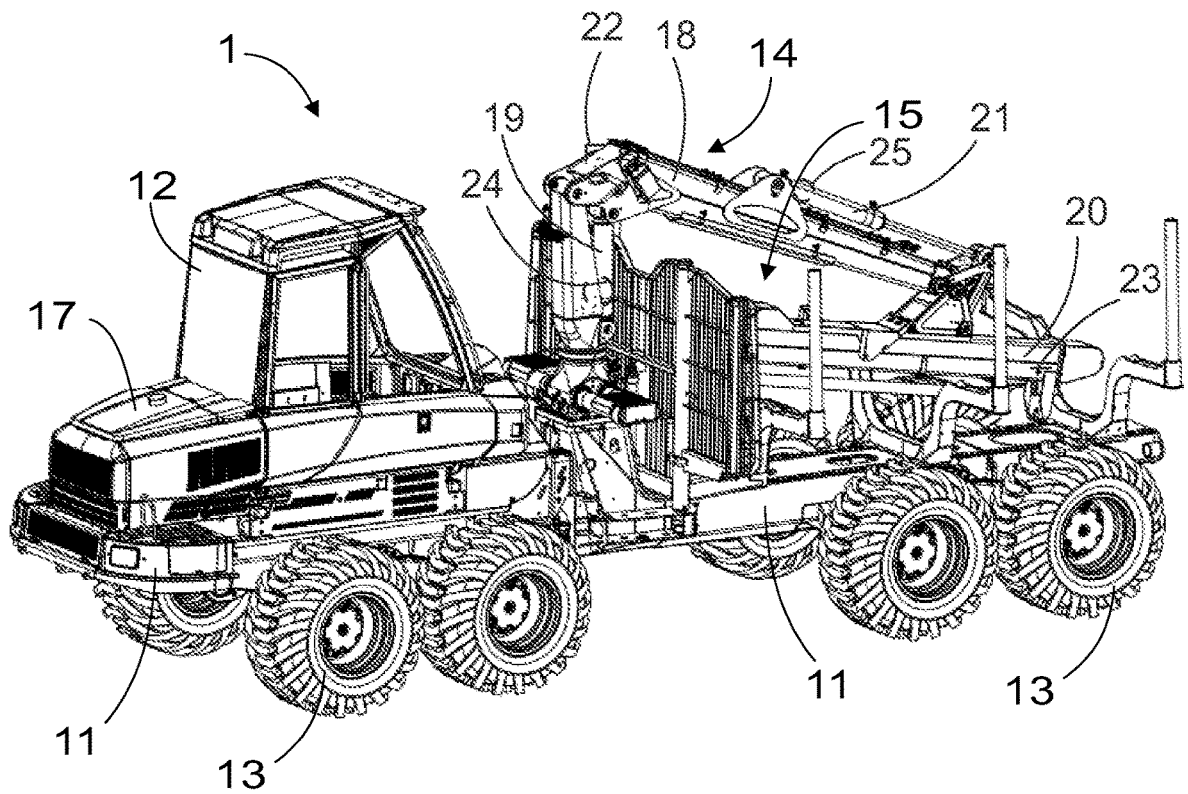
FIG. 1 shows work machine.
Figure 2:
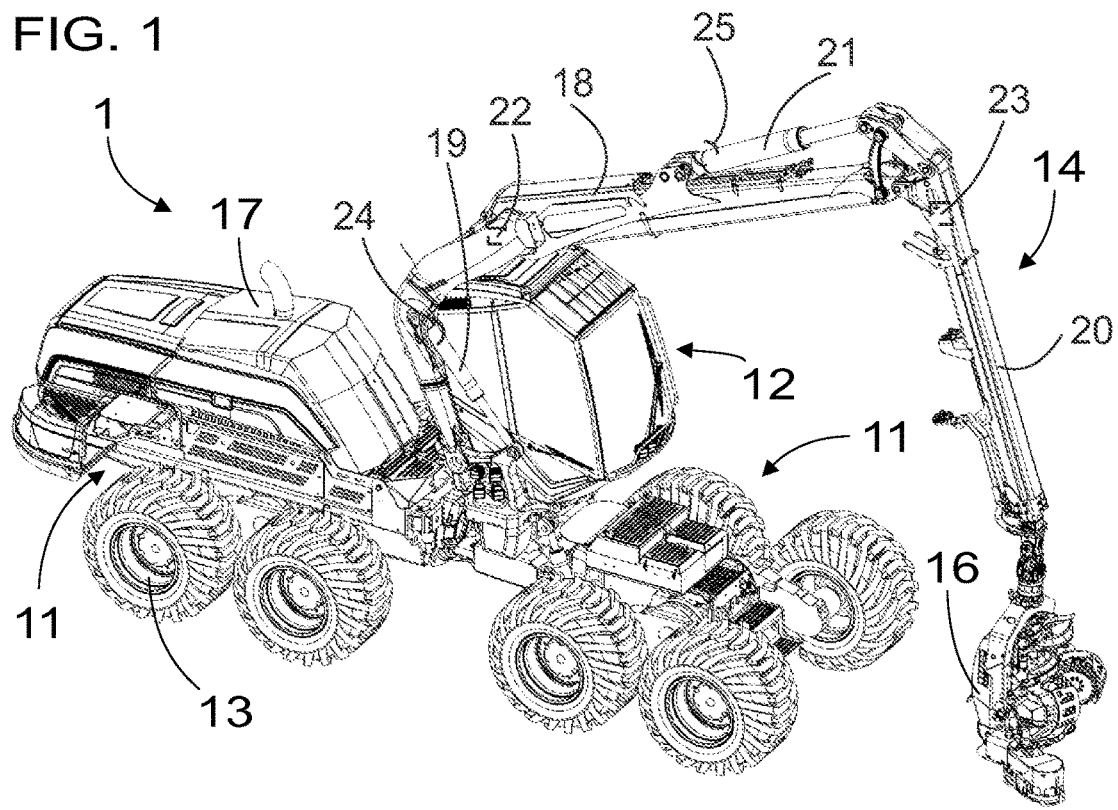
FIG. 2 shows a second work machine.

With reference to FIGS. 1 and 2, FIGS. 1 and 2 show working machines. A working machine 1 may comprise a mobile working machine 1 and particularly advantageously a mobile working machine 1 adaptable to move in an inclined and/or uneven surface. Such a mobile working machine may be, for example, a forest work unit, such as a forwarder as in FIG. 1, a harvester as in FIG. 2, or another forest machine, such as a drive machine of another type suitable for carrying a load, or a combination of a forwarder or harvester, or another mobile working machine such as a mining machine or excavator.

The work machine 1 may comprise one or more frame parts 11. A boom assembly 14 may be adapted on at least one frame part 11. The working machine may also comprise a tool 16 adapted to the boom assembly 14, for example. The tool may comprise, for example, a hoisting member, such as a load bucket and/or a wood handling tool, such as a harvester head. The forest machine may be body-steered and comprise at least two body parts 11.

Depending on the embodiment, the working machine 1 may also comprise other structural parts. For example, the working machine 1 may comprise a control cabin 12 adapted on at least one body part 11. The work machine 1 may further comprise moving means 13, which moving means 13 may comprise at least one of the following: wheels adapted on an axle, wheels adapted on a swinging axle, wheels adapted on a tandem axle, a track system or another means known per se to cause the work machine to move in relation to its working surface.

The boom assembly 14 may be adapted to the frame or control cabin 12. The cabin 12 and/or boom assembly 14 may be adapted foldably and/or rotatably in relation to the carriage. It will be obvious for a person skilled in the art that the working machine 1 typically comprises numerous additional structural and functional structure parts and entities depending on the type of the working machine, such as a cargo space 15, power source 17, and so forth.

In FIG. 1, the boom assembly 14 is formed so that a base with a slewing ring is fixed to the work machine 1. The slewing ring further has a lower ring and an upper ring bearing-mounted in relation to each other. The upper ring is rotated by a toothed-bar machine unit operated by hydraulic cylinders.

A crane column is attached to the upper ring. The crane column in turn has a lifting boom 18 pivoted to it. The lifting boom 18 is moved by a lifting cylinder 19.

Further, a luffing boom 20 is pivoted to the lifting boom 18. The luffing boom 20 is moved by a folding cylinder 21. The luffing boom 20 may have a telescopic extension moved by its own actuator. At the end of the telescopic extension, a tool such as a load bucket may reside.

As concerns the basic solution, the boom assembly 14 of FIG. 2 corresponds to the boom assembly 14 of FIG. 1. However, with regard to the base, the boom assembly 14 of FIG. 2 differs from the structure of FIG. 1. In the solution of FIG. 2, the upper ring of the swivel ring is provided with an inner toothing and it is rotated by a motor which rotates a gearwheel against the inner toothing.

The boom assembly 14 may also be described as having, as its successive parts, a ring base to be rigidly connected to a work machine, a foot section rotatably bearing-mounted to the ring base, a first boom pivoted to the foot section, a second boom pivoted to the first boom, and possibly a telescopic arrangement in the second boom. In addition, the boom assembly comprises actuators to operate each successive part.

In connection with each part of the boom assembly 14, a travel speed sensor is adapted. For reasons of clarity, FIGS. 1 and 2 schematically illustrate only the travel speed sensor 22 of the lifting boom and the travel speed sensor 23 of the luffing boom, but advantageously, as mentioned in the above, there is a travel speed sensor in connection with each part of the boom assembly 14.

The travel speed sensor may be a position sensor, for example. A travel speed sensor allows, for example, an angle and angular acceleration of a boom to be measured. Further, a travel speed sensor allows, for example, the position of the boom and travel speed of a piston of the actuator cylinder to be measured. For example, with the travel speed sensor 22 of the lifting boom the speed of the lifting cylinder 19, and with the travel speed sensor 23 of the luffing boom the speed of the folding cylinder 21 may be measured. The travel speed sensor may comprise an inclinometer and/or gyroscope, for example. Further in the embodiment of FIG. 1, for example, there may be a magnetostrictive linear sensor in connection with the base as the travel speed sensor, providing information on the turning angle. Likewise, the telescopic extension may have a magnetostrictive linear sensor as the travel speed sensor. In the embodiment of FIG. 2, the motor rotating the gearwheel that is in connection with the base may be associated with a rotation angle sensor providing information on the turning angle.

Furthermore, the boom assembly 14 has pressure sensors in connection with each actuator, measuring the pressure at the actuator. For reasons of clarity, FIGS. 1 and 2 illustrate schematically only the pressure sensor 24 in connection with the lifting cylinder, and the pressure sensor 25 in connection with the folding cylinder, but advantageously, as mentioned in the above, there is a pressure sensor in connection with each actuator of the boom assembly 14. A pressure sensor may in principle be adapted in any place of a pressure system. However, a pressure sensor is advantageously connected in connection with an actuator, to the pressure hose bringing in pressure to it. The measured pressure is the pressure of the pressure medium of the pressure system. The pressure medium is a fluid suitable for the purpose. For example, the fluid in connection with a hydraulic actuator may be hydraulic fluid and in connection with a pneumatic actuator the fluid may be pressurized air, for example.

In a previous solution, when a tip of the boom assembly 14 is close to the work machine 1 and the load on the boom assembly 14 is light, the tip of the boom assembly 14 follows the control commands rather precisely. However, when the tip of the boom assembly 14, for example, has been far away from the work machine 1 and has had a heavy load on it, the speed of the tip of the boom assembly 14 has not matched what was requested. It has now been detected that in the latter case the pressure on the lifting cylinder, for example, is larger than in the first case. In the current solution set forth, the magnitude of the control signal of the lifting cylinder is changed on the basis of a pressure measurement, that is, to establish the same speed request as a higher pressure is detected, the magnitude of the control signal is increased.

Thus, the pressure on the actuator depends on the load and its location at the tip of the boom assembly 14. This means that instead of a pressure measurement, the solution described herein allows the use of another variable related to the load and its location at the tip of a boom assembly, other than the pressure on the actuator. Such a variable may be determined, for example, by measuring the mass of a load at the tip of the boom assembly 14 with a weighing sensor and by determining its position in relation to a fulcrum. This way, a torque in relation to a desired fulcrum can be determined.

Figure 3:
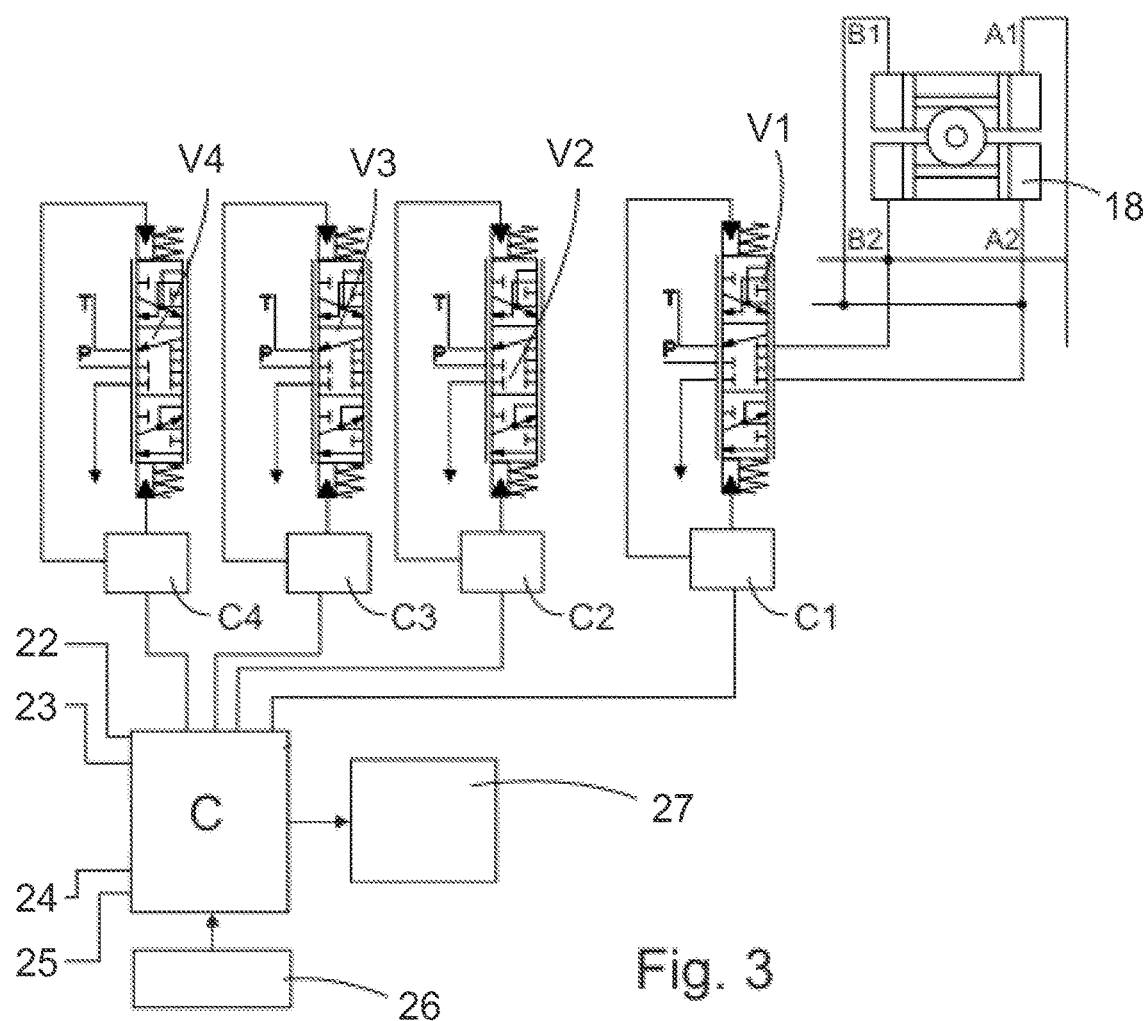
FIG. 3 is a diagram related to hydraulic and electrical control related to tip control.

FIG. 3 shows a diagram of a tip control related system. The system includes a control unit C. Advantageously the control unit C is part of the control system of the work machine 1, but it is herein described as a separate part for reasons of clarity.

Control commands are fed to the control unit C with a controller 26. The controller 26 may comprise stick controllers, keyboards, pointers of a graphical user interface and/or their combinations or other similar controller members. In connection with the controller C, there is additionally a display 27 to illustrate the operation of the work machine 1.

Furthermore, information from the travel speed sensors 22, 23 and pressure sensor 24, 25 is fed to the control unit C. The actuators are operated with proportional valves V1, V2, V3, and V4. For reasons of clarity, FIG. 3 only shows a lifting cylinder 18 of the actuators. Electric control takes place by means of auxiliary control members C1, C2, C3, and C4 from the control unit C.

The control unit C converts the control command of the boom tip, coming from the controller 26, into a control command for each actuator. The control unit C notes the information from the sensors and provides a control signal value to the auxiliary control members. The control signal may comprise, for example, control current or control voltage. In such a case, then, the control signal value is, for example, a control current value (typically of milliamperes) or a control voltage value (typically of volts). The control signal may further comprise another variable having an effect on the opening of a valve.

Figure 4:
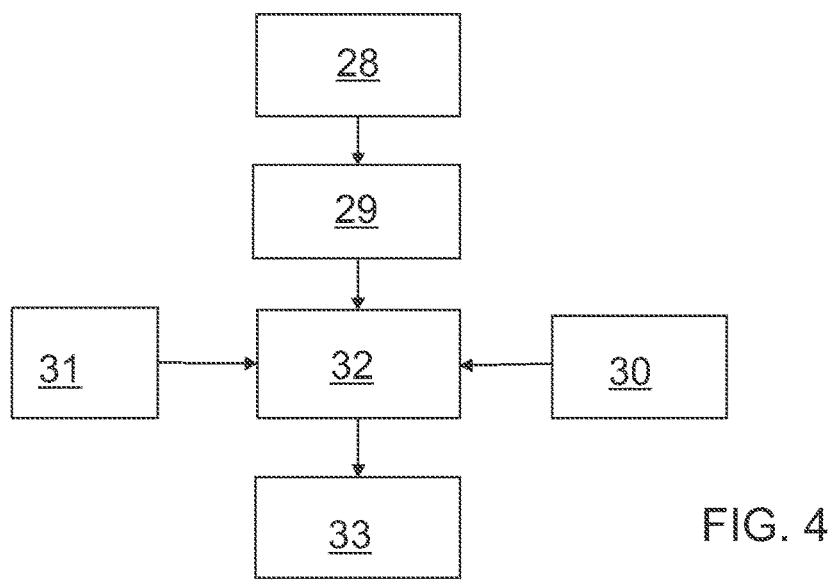
FIG. 4 shows a flow chart of a method according to an embodiment.

The flow chart of FIG. 4 illustrates a method according to an embodiment. In block 28, a control command is issued to a tip of a boom. In block 29, the control command of the tip of the boom is converted into a control command for each actuator. So, a cylinder speed command, that is, a cylinder speed request, is given to the cylinder of each actuator.

Figure 6:
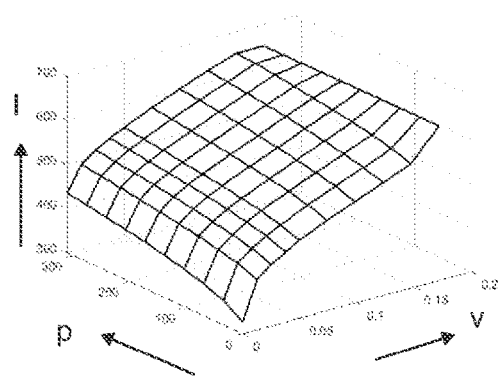
FIG. 6 shows an example of a table illustrating interrelations between variables being used.
Figure 7:
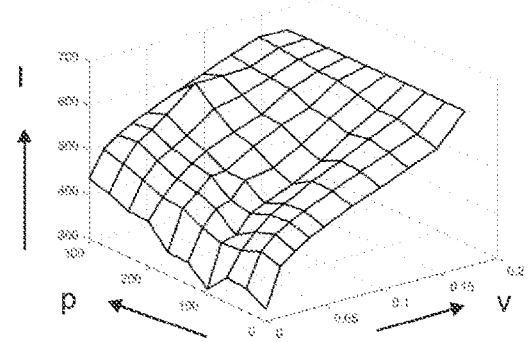
FIG. 7 shows an example of the table in FIG. 6 when calibrated.

Block 30 describes the forming and storing of a table which shows the interrelations between the cylinder speed request, pressure at the actuator, and the control signal value of the control signal fed to the actuator, that is, to the precontrol valve (the proportional valves V1 to V4 in FIG. 3). An example of such a table is illustrated with FIG. 6. In the example of FIG. 6, the control signal is control current.

FIG. 6 has the cylinder speed request v (m/s) on the x-axis, pressure p (bar) on the y-axis, and control current value I (mA) on the z-axis. As shown in FIG. 6, it is typical that the control current value I is naturally the larger the higher the speed request v is. However, it is particularly noteworthy that if the speed request v does not change, but the pressure p, for example, increases, the control current value I also increases.

In block 31, the pressure on the actuator is measured. In block 32, a control signal value is retrieved from the table formed in block 30, corresponding to the cylinder speed request formed in block 29 and the pressure measured in block 31. In block 33, this control signal is fed to the pre-control valve.

Figure 5:
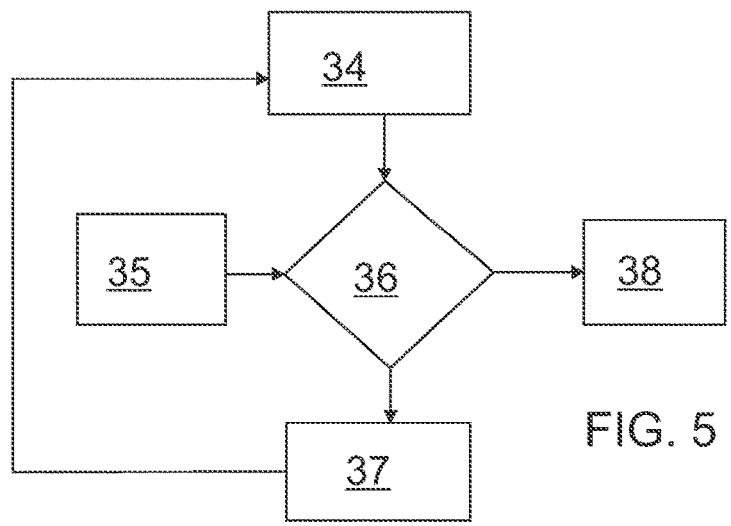
FIG. 5 shows a flow chart of calibration according to an embodiment.

Calibration according to an embodiment is illustrated by a flow chart according to FIG. 5. In block 34, calibration is switched on. An operator may switch on calibration when desired, for example. For example, it is possible to give an indication to the operator from the comparison of block 36, if the detected difference is too large, and the operator may react to such an indication when getting one. Calibration may also be started automatically in response to too large a difference having been detected in block 36. Calibration may be implemented as a separate work stage, or calibration may be implemented in the background during normal working.

In block 35, the realized cylinder speed is measured. In block 36, the realized cylinder speed is compared to the cylinder speed request, and the difference between the measured realized speed and speed request exceeds the allowed limit value, the table in question is calibrated at the operating point in question, so the option YES, and table updating in block 37. If the difference does not exceed the limit value, the option NO is followed, and the table is not in this regard updated—block 38.

Block 37 may have feedback to block 34 to continue calibration. Calibration may also be continued at other operating points, for example. Calibration may also be utilized in the forming of the table in question. The table may be two-dimensional to begin with, that is, it has the relation between the speed request and control signal value on at one pressure level, only. With the calibration procedure, the values in question can then be formed at other pressure levels.

The computer program product in the control unit C comprises computer-readable program code which is arranged to implement the functions of the disclosed tip control or the steps of the method that carries out the functions as the program code is being performed by a processor. The control unit C comprises processing means or a processor. The control unit C may comprise memory in which information has been gathered and stored as well as is being gathered and stored. The processing means may be adapted to carry out at least part of the process steps and/or operations disclosed in this specification. In an embodiment, the processing means may be adapted to receive and send information and commands. The processing means may comprise a programmable logic and/or programmable microprocessor, for example. The processing means may form the control unit C or a part thereof.

An embodiment comprises a computer program comprising a program code which, when executed on a computer, executes functions according to any of the embodiments described above. The computer program may be included in a computer-readable storage medium, for instance in a non-volatile memory.

An embodiment comprises a computer program product comprising a computer program according to an embodiment for executing functions according to any of the embodiments described above.

In an embodiment, the apparatus comprises processing means configured to execute functions described in an embodiment. The processing means may serve as a computer for executing the program code. The processing means may comprise at least one processor, memory and program platform capable of executing the program code.

Embodiments can be implemented as a computer process that is defined by a computer program. The computer program may be in source code format, object code format or an intermediate format, and the computer program can be stored on a storage medium that may be any piece or apparatus that is capable of storing the computer program. For instance, a computer program can be stored on a computer program distribution medium that can be read by a computer or processor. The computer program distribution medium may comprise a storage medium, computer memory, read-only memory (ROM), electric carrier wave, telecommunications signal, and software distribution package, for instance.

In an embodiment, a computer program product may be stored on a computer-readable media and executable by a processor, and the computer program product may comprise computer-readable program code. This type of computer program product may be arranged to execute at least some of the steps in the method described above, when the program code is run in a processor.

In the examples of the figures, the actuators are hydraulically operated, in particular all the actuators (cylinders) of the boom assembly. If so desired, the actuators may be, for example, pneumatic or electrically operated actuators.

Those skilled in the art will find it obvious that, as technology advances, the basic idea of the invention may be implemented in many different ways. The invention and its embodiments are thus not restricted to the examples described above but may vary within the scope of the claims.

The invention claimed is:

1. A method for controlling a boom of a work machine by tip control, the method comprising:
    issuing a boom control command to a tip of the boom,
    converting the boom control command of the tip of the boom into actuator control commands for individual actuators of the boom, and
    determining a variable related to a load and its position at the tip of the boom,
    wherein the converting of the boom control command into the actuator control commands comprises forming a speed request for each of the actuators, the actuator control commands for the individual actuators being magnitudes for speed control signals of each respective actuator, wherein the magnitude of the speed control signal for each respective actuator depends on the speed request of the respective actuator and the variable in order to maintain a desired speed for the respective actuator.

2. The method as claimed in claim 1, wherein a data structure stores interrelations between speed control signal magnitudes, speed requests, and the variable, and
    wherein the magnitudes of the control used in the converting are determined from the data structure.

3. The method as claimed in claim 2, wherein the data structure is calibrated in response to a difference between a measured speed of a given actuator and a speed request for the given actuator exceeding a preset largest allowed limit value.

4. The method as claimed in claim 3, wherein calibration is performed while the work machine is working.

5. The method as claimed in claim 1, wherein the speed control signals comprise control current or control voltage.

6. The method as claimed in claim 1, wherein the actuators of the boom are hydraulic actuators.

7. The method as claimed in claim 1, wherein the variable is pressure on the actuators.

8. The method as claimed in claim 1, wherein the work machine is a forest work machine.

9. A non-transitory computer-readable medium storing computer-readable program code that, when executed by a processor, is configured to perform operations corresponding to the method according claim 1.

10. The method as claimed in claim 4, wherein the work machine is operable in a calibration mode.

11. A control system configured to control a boom of a work machine by tip control, the control system including:
    a controller configured to enable control of a tip of the boom,
    sensors configured to determine a variable related to a load and its position at the tip of the boom, and
    a processor configured to convert a boom control command, given by the controller, into actuator control commands for individual actuators of the boom,
    wherein the converting of the boom control command into the actuator control commands comprises forming a speed request for each of the individual actuators, the actuator control commands for the individual actuators being magnitudes for speed control signals for each respective actuator, wherein the magnitude of the speed control signal for each respective actuator is dependent on the speed request of the respective actuator and the variable in order to maintain a desired speed for the respective actuator.

12. The control system as claimed in claim 11, wherein a data structure is configured to store interrelations between speed control signal magnitudes, speed requests, and the variable, and
    wherein the processor is further configured to determine magnitudes of the speed control signals based on the data structure.

13. The control system as claimed in claim 12, the processor is further configured to calibrate the data structure in response to a difference between a measured speed of a given actuator and a speed request for the given actuator exceeding a preset largest allowed limit value.

14. The control system as claimed in claim 11, wherein the speed control signals comprise a control current or control voltage.

15. The control system as claimed in claim 11, wherein the sensors comprise pressure sensors configured to determine the variable by measuring pressure on the actuators of the boom.

16. A work machine comprising a boom and the control system as claimed in claim 11.

* * * * *